United States Patent

[11] 3,575,339

[72] Inventor Vytautas Kupcikevicius
  Chicago, Ill.
[21] Appl. No. 862,120
[22] Filed Aug. 4, 1969
  Division of Ser. No. 575,462, Aug. 26, 1966,
  Pat. No. 3,483,801.
[45] Patented Apr. 20, 1971
[73] Assignee Union Carbide Corporation

[54] CASING CLOSURE
  2 Claims, 36 Drawing Figs.
[52] U.S. Cl. .................................................... 229/54,
  229/62, 206/65, 99/176
[51] Int. Cl. ...................................................... B65d 33/00,
  B65d 33/14
[50] Field of Search........................................... 229/54, 62,
  63, 65, 66, 52; 150/11, 12; 17/34; 206/65, 46 (F);
  99/176

[56] References Cited
UNITED STATES PATENTS
2,307,181 1/1943 Young.......................... 229/65
3,064,803 11/1962 Eichin et al.................. 206/65
3,401,042 9/1968 Frederick et al............. 99/176

Primary Examiner—David M. Bockenek
Attorneys—Paul A. Rose and John F. Hohmann

ABSTRACT: The term "food casing," as employed throughout this application and in the appended claims, is intended to include, but not be restrictive of, those tubular food casings fabricated from such materials as collagen, cellulose, regenerated cellulose, cellulose having fibers embedded therein, polyvinyl chloride, polypropylene, polyethylene, polyvinylidene chloride, and the like. These food casings are also known by those skilled in the art as "sausage casings" and are generally employed as containers or molds into which is stuffed or encased a food item, such as raw meat emulsions, meat chunks, discrete meat cuts and the like. These encased food items can then be frozen or, if desired, processed, as by cooking and curing, and items such as salami and bologna sausages, spiced meat loaves, ham loaves, hams, and the like can be obtained.

INVENTOR
VYTAUTAS KUPCIKEVICIUS
ATTORNEY

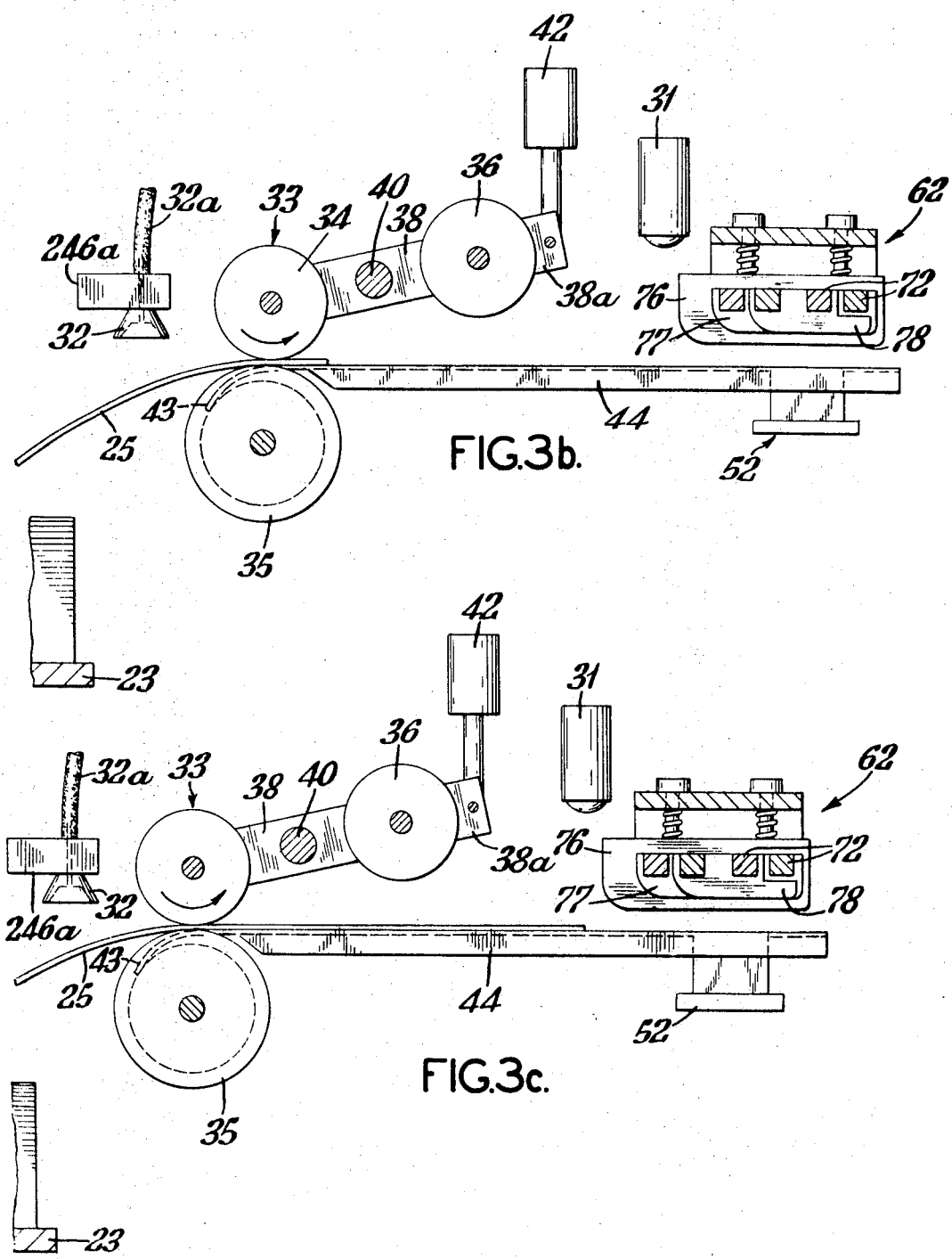

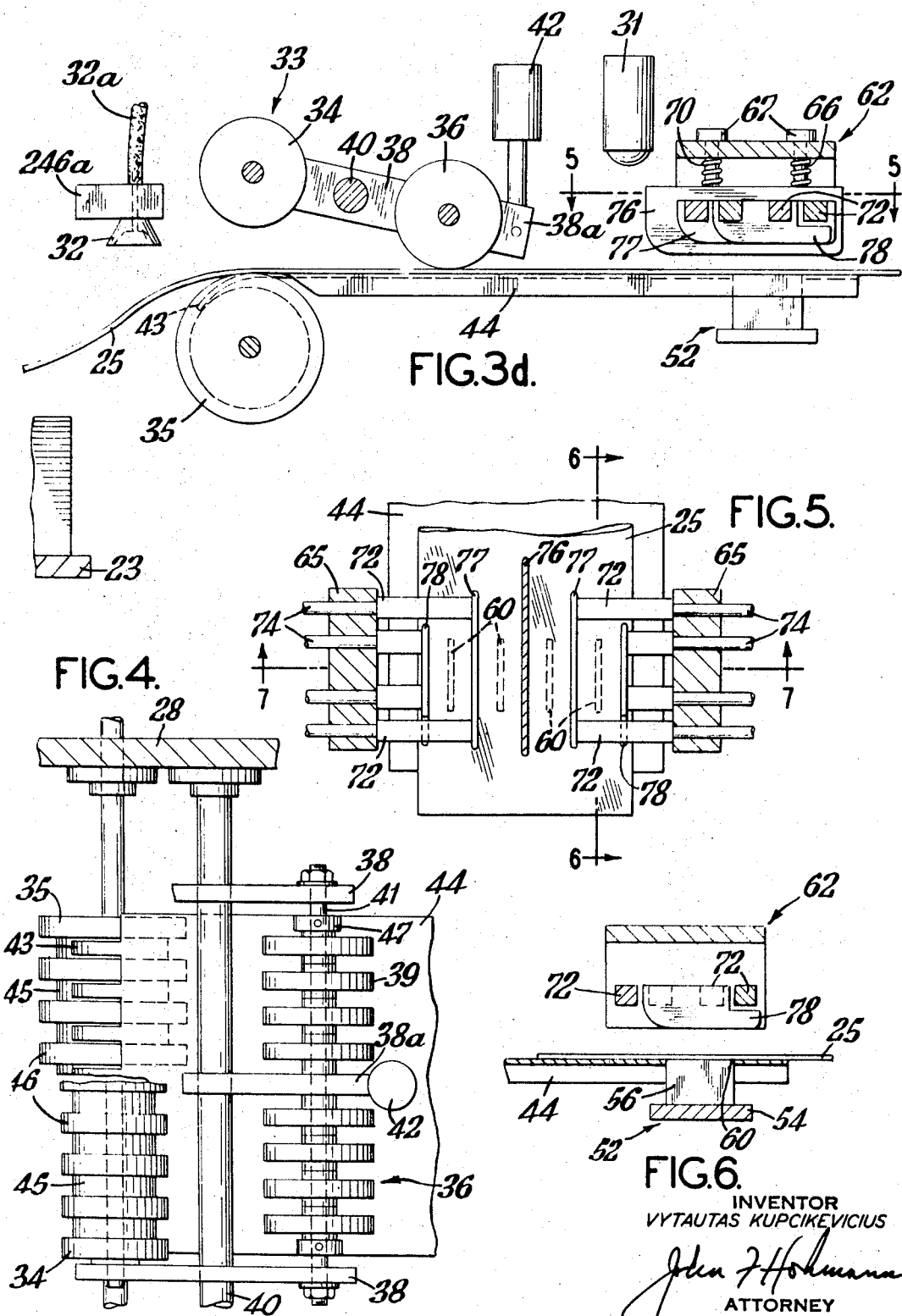

INVENTOR
VYTAUTAS KUPCIKEVICIUS

ATTORNEY

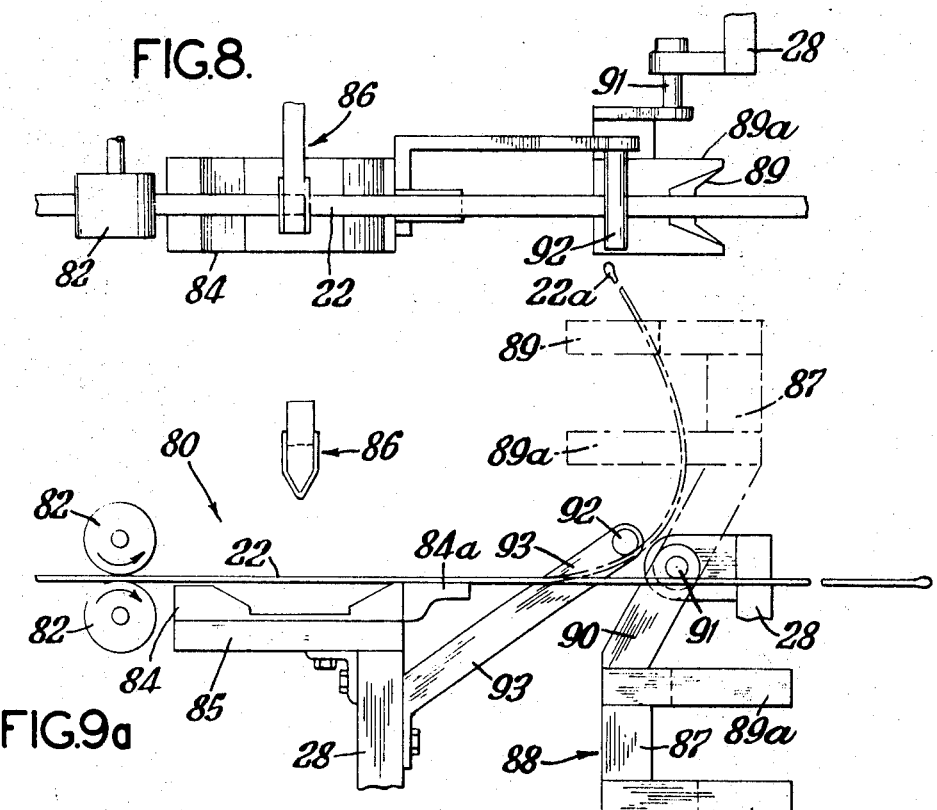
FIG.8.
FIG.9a
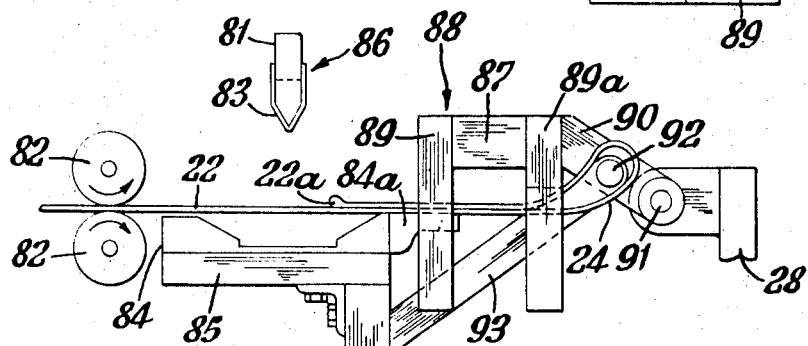
FIG.9b.
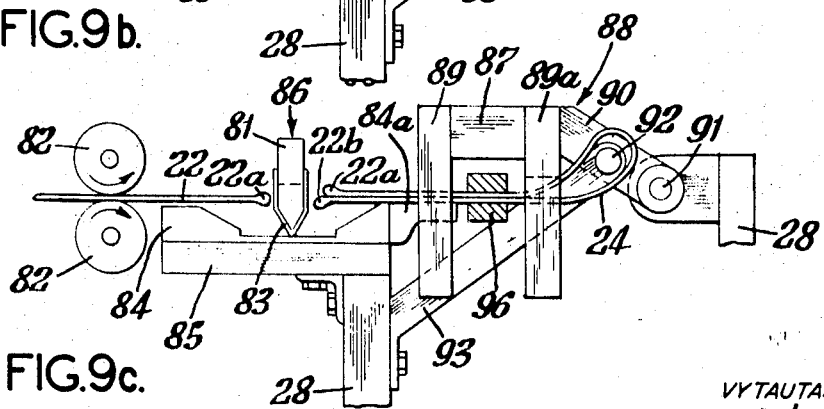
FIG.9c.
INVENTOR
VYTAUTAS KUPCIKEVICIUS
ATTORNEY Patented April 20, 1971
3,575,339
12 Sheets-Sheet 8
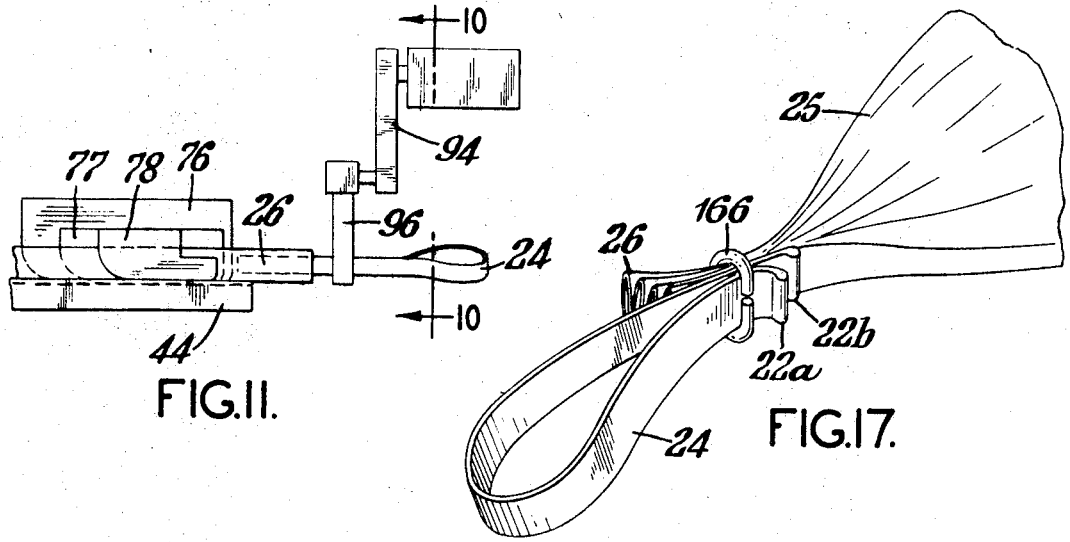
FIG.11.
FIG.17.
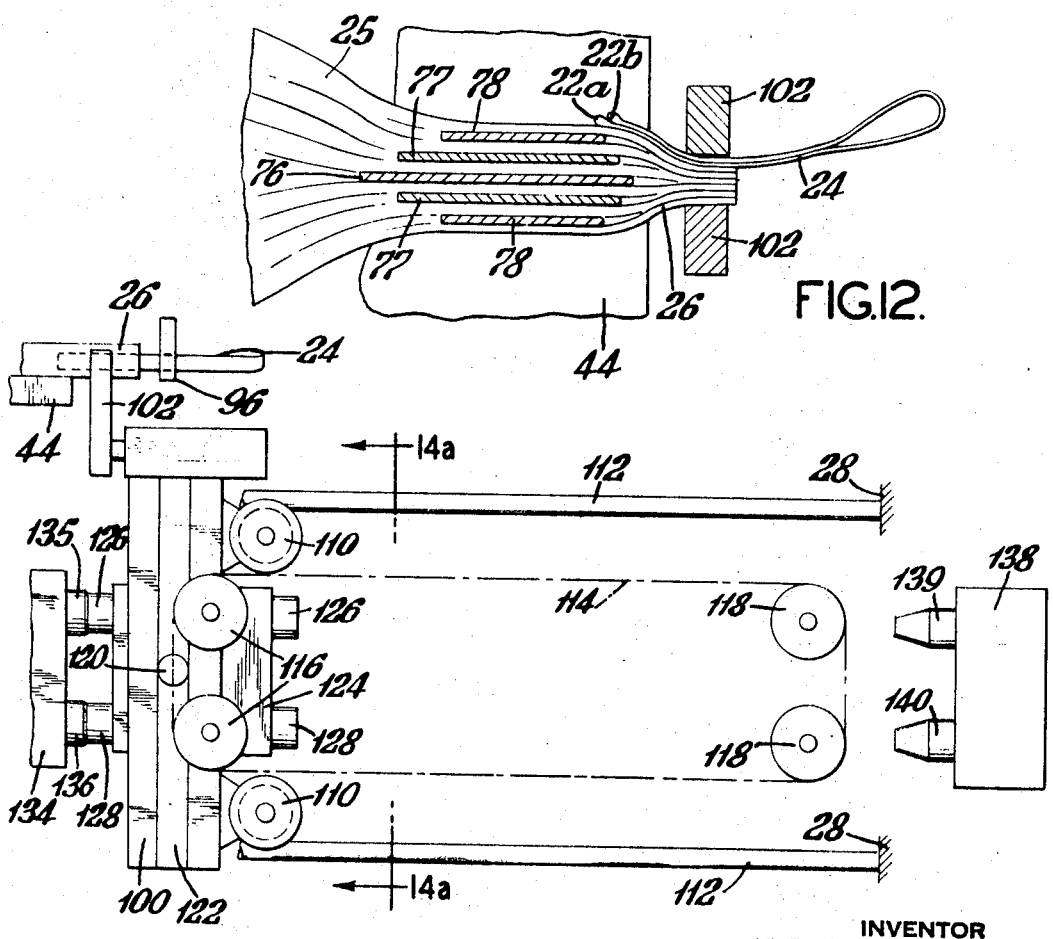
FIG.12.
FIG.13a.
INVENTOR
VYTAUTAS KUPCIKEVICIUS
ATTORNEY

INVENTOR
VYTAUTAS KUPCIKEVICIUS

ATTORNEY

Patented April 20, 1971

INVENTOR
VYTAUTAS KUPCIKEVICIUS
ATTORNEY

Patented April 20, 1971

INVENTOR
VYTAUTAS KUPCIKEVICIUS

John F. Holmann
ATTORNEY

Patented April 20, 1971
3,575,339
12 Sheets-Sheet 12
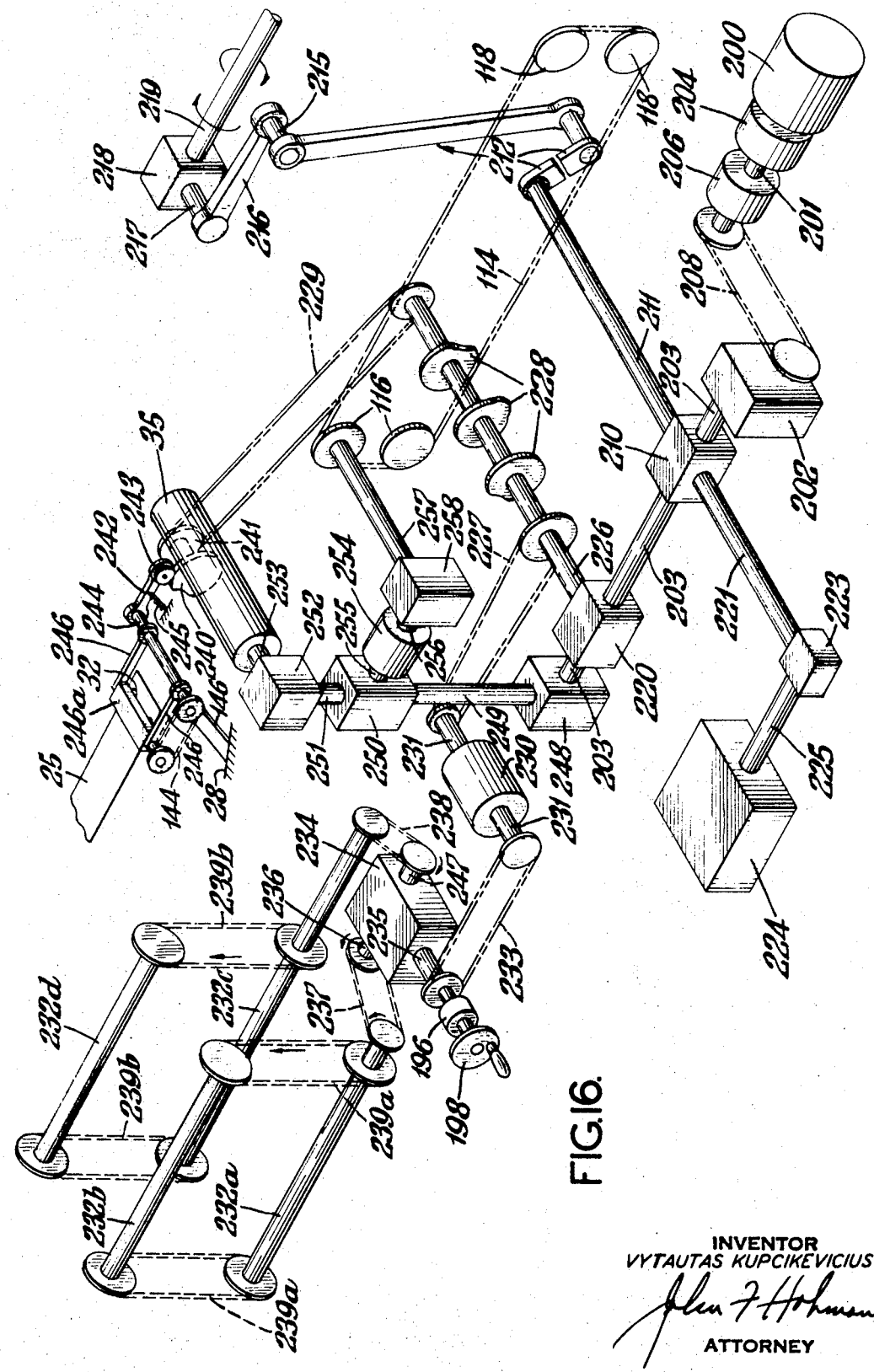
FIG.16.
INVENTOR
VYTAUTAS KUPCIKEVICIUS
ATTORNEY

CASING CLOSURE

This is a division of application Ser. No. 575,462, filed Aug. 26, 1966, now U.S. Pat. No. 3,483,801.

The present invention relates to a closed food casing.

Food casings are usually stuffed with such food items by the use of mechanical equipment. A first end of the food casing is closed and the open or second end is placed over a horn or outlet means from which the food item is ejected under pressure until the food casing is stuffed. The closed end of the food casing must, therefore, be strong enough to withstand the stuffing pressure and also be sufficiently secured so that no food will escape therefrom during stuffing. The second end of the thusly stuffed food casing is then closed and the encased food product further processed in conventional apparatus, such as cooking ovens, smoke houses and the like, where the stuffed food product is cooked and cured and then stored until ready for use or further processing. In general, one end closure of the casing is provided with a looped hanger, such as stout twine, to suspend the stuffed food casing thereby during the processing and storage period. The looped hanger is usually made as an integral part of the first end casing closure.

In present manufacturing methods, these lengths of cured and cooked food products, which can be over 5 feet in length and weigh more than 40 pounds, are then cut transversely into slices of equal thickness and weight, either before or after removing the food casing therefrom, and are then packaged and sold through retail outlets in today's commercial market places.

In accordance with conventional practice, the first end closure is made on the flattened food casing when they are dry. These food casings are then soaked in water before being stuffed in order to render them more pliable during stuffing. The methods presently employed to close one end of a food casing and provide a hanger loop therefor include the use of string, twine, cupclips and the like as is disclosed in U.S. Pat. No. 2,462,957, U.S. Pat. No. 2,697,970 and U.S. Pat. No. 3,010,621. During the soaking of those food casings provided with loops of string or twine, the loops often become knotted and tangled and must be manually unraveled before the casing is stuffed or, in any event, before the stuffed food casing is suspended for subsequent processing, curing and cooking.

Since industry is now tending to demand longer and heavier encased food products, attachment of a suitable suspension means to these food casings is becoming increasingly more important. Obviously, suspension means which tend to damage the casing wall so that the casing breaks or suspension means which break or become separated from the encased food products during handling and processing results in waste.

Pleating apparatus have also been devised and employed to pleat one end of a food casing preparatory to making and forming a closure in the pleated end, such as apparatus described in U.S. Pat. No. 2,708,059, U.S. Pat. No. 2,697,970, U.S. Pat. No. 3,224,083, and U.S. Pat. No. 2,589,792. While such apparatus have proven to be operable, they tend to damage the casing wall and are, generally, complex and cumbersome in their operation and also involve many manual operations.

It is an object of the present invention therefore to provide a pleated food casing with a suspension means capable of supporting an encased food product for extended periods of time during subsequent processing, cooking and curing and which suspension means provides easier manual handling of the processed product.

These and further objects of the present invention will become apparent when considered in light of the ensuing discussion.

The objects of the present invention can be accomplished by providing an apparatus which generally comprises means for automatically and continuously supplying individual flattened, tubular food casings from a source of supply; means for automatically pleating one end of said food casings; and means for automatically closing the thusly pleated end of said food casing.

The apparatus can also be adapted to include means for automatically supplying a length of suitable material to form a hanger loop; means for forming a hanger loop; means for positioning the hanger loop adjacent the pleated casing end; means for forming a closure clip; and means for affixing the closure clip about the pleated casing end and about the hanger loop positioned adjacent thereto.

The invention will be more clearly understood when considered together with the accompanying drawing which is set forth by way of illustration thereof and is not intended, in any way, to be limitative thereof and wherein.

Figure 10A:
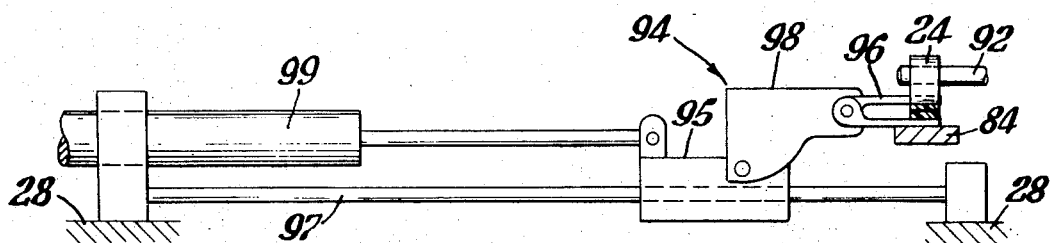
Figure 10B:
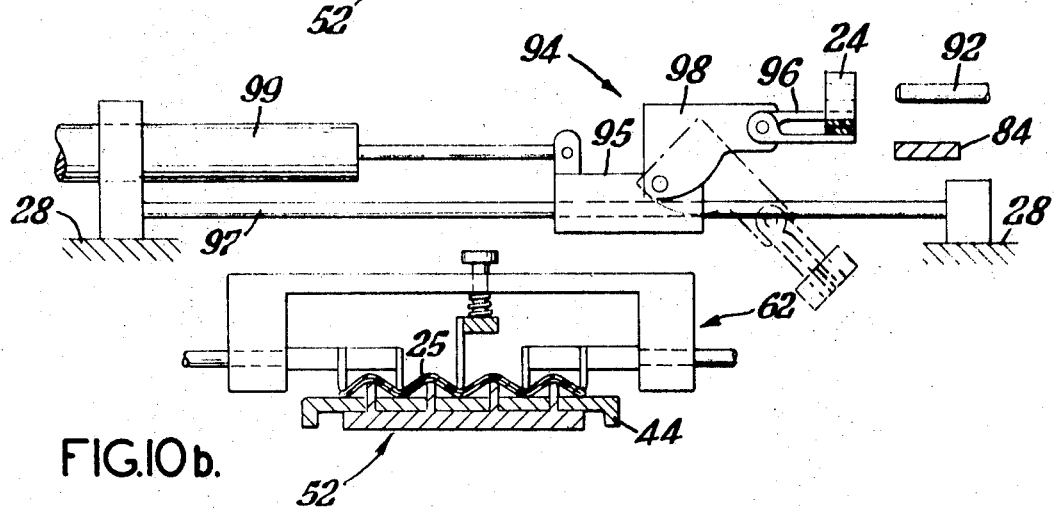
Figure 10C:
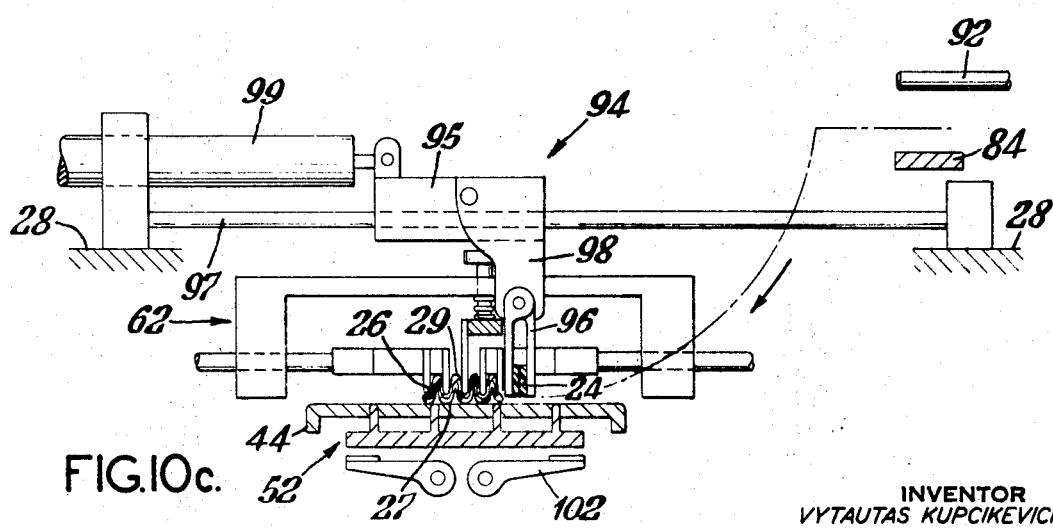
Figure 13B:
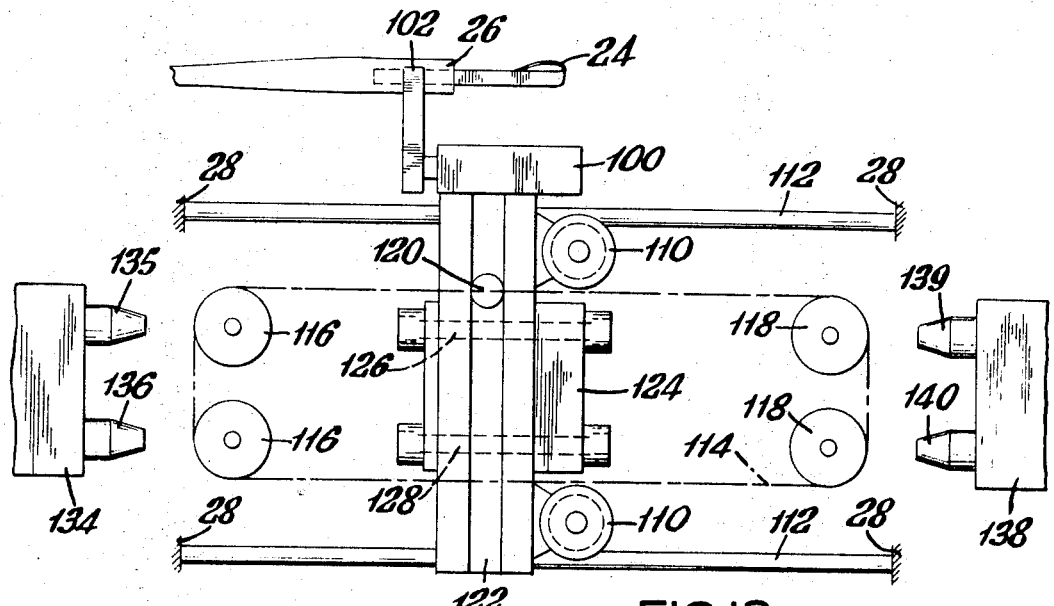
Figure 13C:
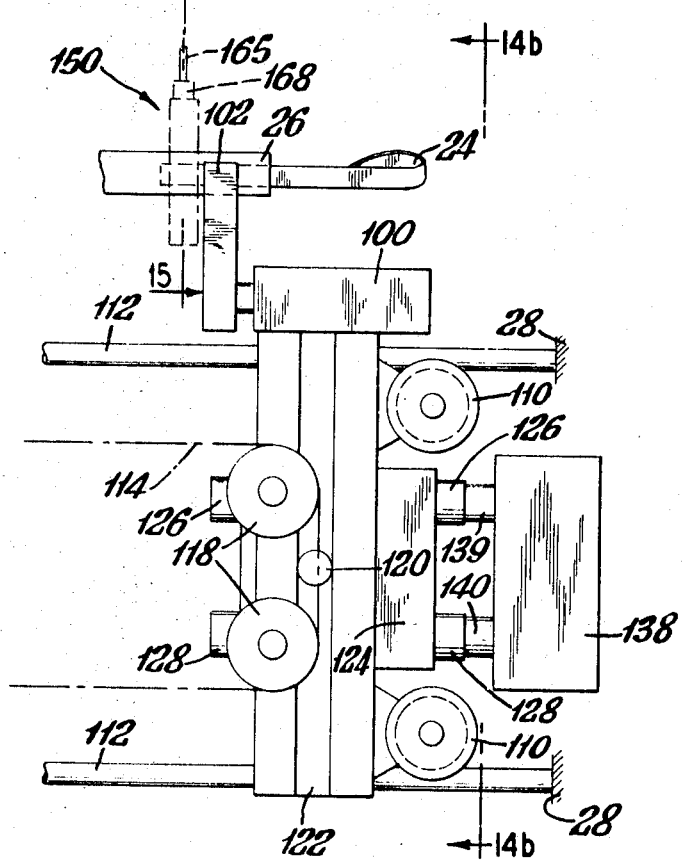
Figure 14A:
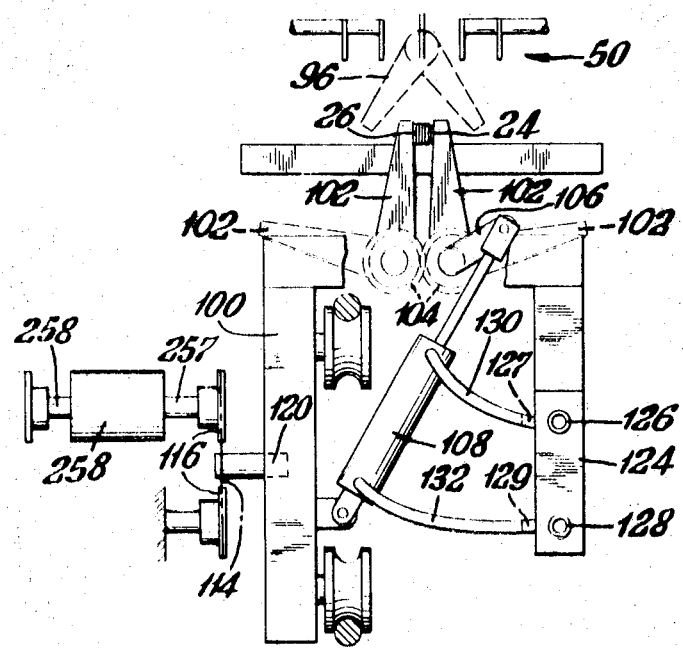
Figure 14B:
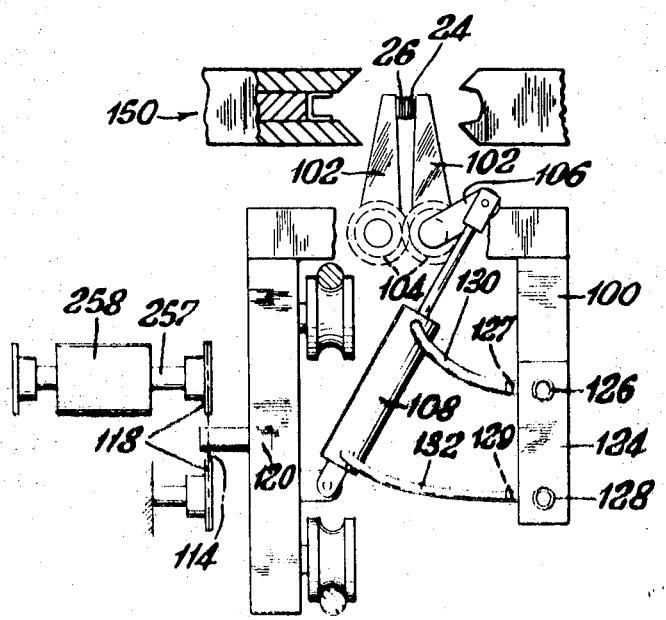

FIGS. 3a—3d are enlarged side elevational views, partly in section, of a portion of the casing supply and feed means illustrating the sequence of operation of feeding the casings from the supply table to the pleating means;

FIG. 4 is a top plan view, partly in section, of a portion of the feed means shown in FIGS. 3a—3d;

FIG. 5 is a sectional view taken along line 5-5 of FIG. 3d showing a portion of the pleating means at Station II and the casing positioned therein;

FIG. 6 is a sectional view, taken along line 6-6 of FIG. 5;

FIGS. 7a—7e are sectional views, taken along line 7-7 of FIG. 5 and illustrating the sequence of operation of the pleating means at Station II;

FIG. 8 is a top plan view of the hanger loop forming means;

FIGS. 9a—9c are side elevational views partly in section illustrating the sequence of operation of the hanger loop forming means at Station III;

FIG. 10a is an end elevational schematic view, partly in section, taken along line 10-10 of FIG. 11 illustrating the hanger loop transfer means;

FIGS. 10b and 10c are end elevational schematic views, partly in section, taken along line 10-10 of FIG. 11 and showing, partly in phantom, the sequence of operation of the hanger loop transfer means;

FIG. 11 is a side elevational schematic view of the hanger loop transfer means employed to transfer the formed hanger loop from Station III into position adjacent the pleated end of the casing at Station II;

FIG. 12 is a top plan view, partly in section, illustrating the position of pleating components in the pleated end of the casing;

FIG. 13a—13c are side elevational views, illustrating the casing transfer means employed to transfer the pleated casing end and hanger loop from Station II to Station IV;

FIG. 14a is an end elevational view, partly in section, taken along line 14a-14a of FIG. 13a illustrating the casing transfer means positioned at Station II;

FIG. 14b is an end elevational view, partly in section, taken along line 14b-14b of FIG. 13c illustrating the casing transfer means positioned at Station IV;

FIGS. 15a—15f are enlarged sections taken along line 15-15 of FIG. 13c, illustrating the sequence of operation of the clip closure means at Station IV;

FIG. 16 is a schematic perspective view illustrating one embodiment of a drive means which can be employed with the apparatus used in the present invention; and FIG. 17 is a perspective view of a portion of a casing with one end closed by the closure means of this invention.

Figure 1:
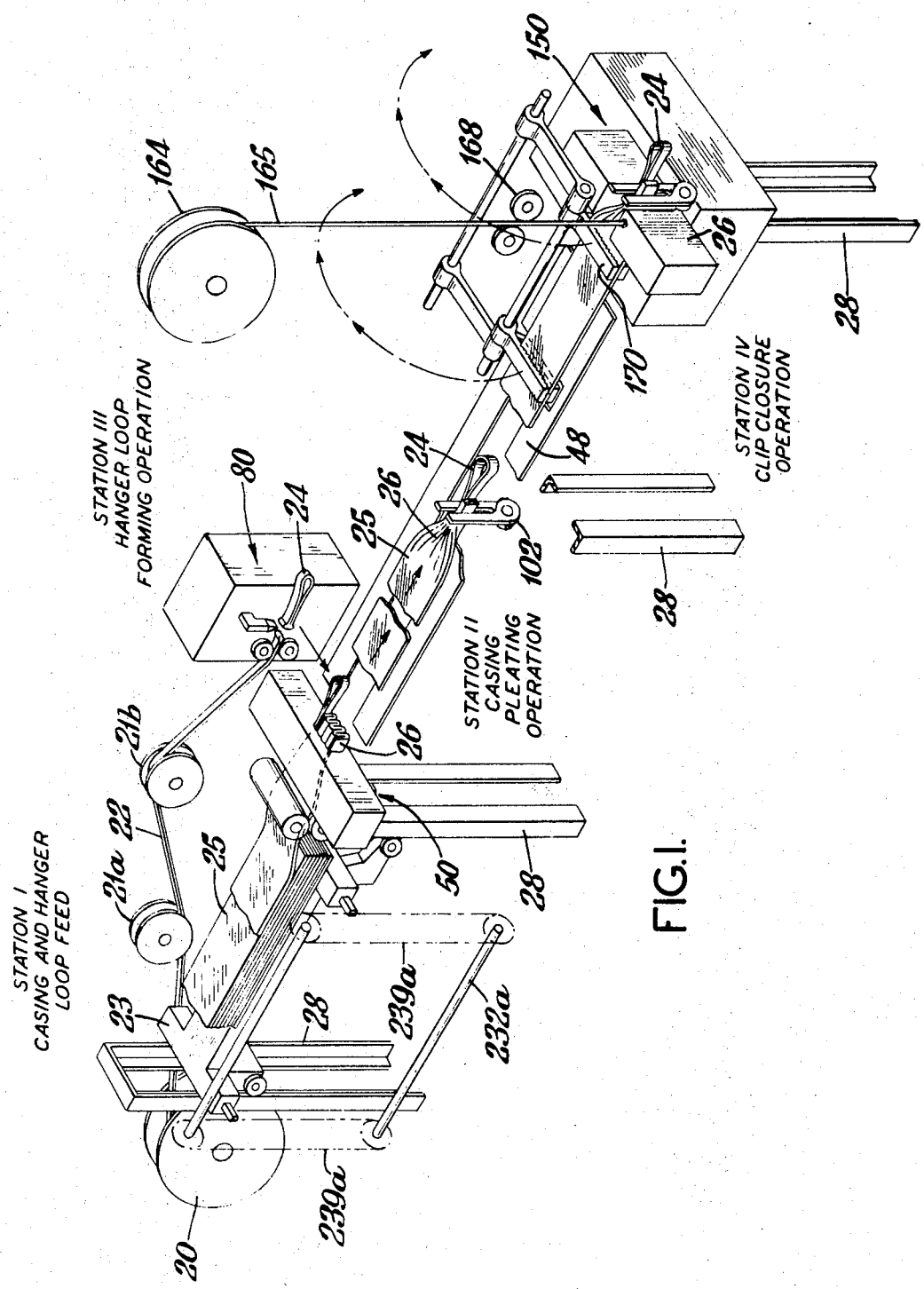
FIG. 1 is a schematic perspective view of one embodiment of the apparatus for producing the closed food casing of the present invention illustrating the component elements and major operating stations of the apparatus.

Turning now to the drawing, wherein like reference numerals denote like parts, there is illustrated in FIG. 1 one embodiment of the apparatus suitable for use in the present invention in which reference numeral 20 denotes a supply reel from which is unwound an inventory of material 22 suitable for forming a hanger loop, and which is automatically and continuously supplied to a hanger loop forming means, generally designated by reference numeral 80, at Station III.

A flattened, tubular, food casing 25, both ends of which are open and which has been cut across the flattened width thereof, is supplied from an inventory of food casings stacked on a supply table 23. The tubular, flattened food casing 25 is fed to the pleating means, generally designated by reference numeral 50, at Station II.

At Station II, the food casing 25 is pleated while, at Station III, a hanger loop 24 is formed and is then transferred to and positioned adjacent the pleated casing end 26. The thusly positioned hanger loop 24 and the pleated casing end 26 are clamped firmly together by clamping jaws 102.

Once clamped together, the pleated casing and hanger loop are transferred to and indexed at Station IV where a wire clip closure is applied. During transit, the free end of the casing 25 is supported by a split connecting work surface 48. At Station IV, an inventory of clip wire 165 is fed from a supply reel 164 to a clip forming means, generally designated by reference numeral 150, which forms and firmly fastens a clip about both the pleated casing end 26 and the hanger loop 24. The end closure of the casing is now completed and the casing is automatically removed from the apparatus by rotating clamps 170.

STATION I—APPARATUS

Figure 2:
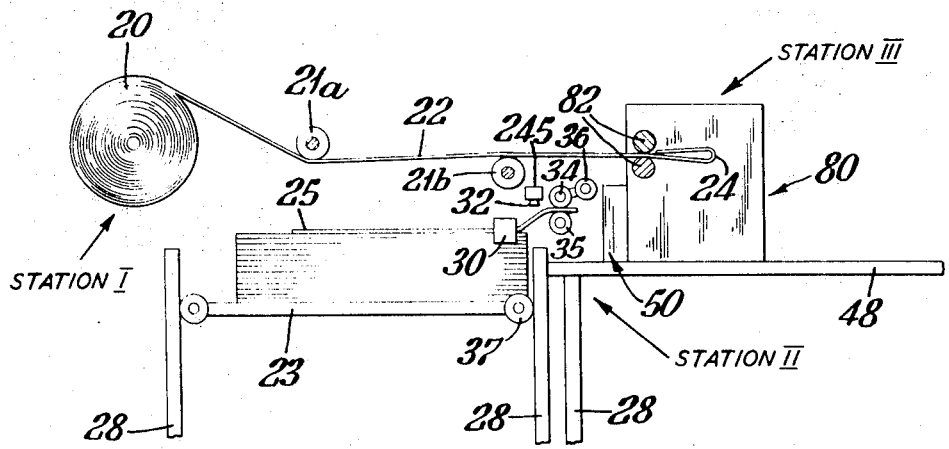
FIG. 2 is a side elevational view of Stations I, II, and III illustrating the feed and supply means to supply and feed the casings and the material and means used to form the hanger loop.

In FIG. 2, there is shown the supply reel 20 from which is drawn an inventory of hanger loop material 22. The hanger loop material 22 is trained about guide rolls 21a and 21b and is continuously and automatically fed to the hanger loop forming means 80. Meanwhile, an individual, flattened, tubular food casing 25 is being automatically fed from a stack of food casings on the supply table 23 to the pleating means 50. The supply table 23 is affixed horizontally to the inboard flights of roller chains 239a, 239b (FIGS. 1 and 16) which are vertically intermittently driven by counterrotating shafts 232a, 232c energized and controlled by drive means later described. Table 23 is stabilized in frame 28 by guide rollers 37. Supply table 23 supports a stack of casings 25 and is moved vertically upward by the drive means to a predetermined casing pickup level to permit an individual casing 25 to be lifted from the top of the stack and fed to the pleating means 50. The pickup level is controlled by photoelectric eye 30 (FIG. 2) trained across the top of the stack, which automatically arrests the vertical movement of the table when the stack intercepts the light beam.

Vacuum cups 32 (FIGS. 2, 3a and 16) are secured to mounting bar 246a and are connected by a flexible hose 32a to a source of vacuum (not shown) to pick up the uppermost casing 25 from the stack of casings. The mounting bar 246a is rotatably mounted on crank arms 246 (FIG. 16) and is adapted for movement of the vacuum cups from a pressing engagement with the stack of casings to the casing feed discharge position. As crank arms 246 pivot about shaft 244, vacuum cups 32 lift the leading edge of casing 25 from the stack and advance it toward a yoke mechanism generally designated by reference numeral 33. The yoke mechanism 33, (FIGS. 3a—3d and 4) comprises a trailing upper feed roll 34 and a leading upper feed roll 36 which are rotatably mounted in tandem at the ends of a pair of connecting bars 38. Connecting bars 38 are, in turn, pivotally mounted to the frame of the apparatus 28 by means of a pivot shaft 40. Oscillation of the yoke mechanism 33 is accomplished by means of air cylinder 42 connected centrally to one end of yoke operating bar 38a. The other end of operating bar 38a is secured to pivot shaft 40.

A rotatably mounted lower feed roll 35 is positioned below trailing upper feed roll 34 so that it cooperates with trailing upper feed roll 34 when trailing upper feed roll 34 is oscillated downwardly. Lower feed roll 35 is driven to rotate in a clockwise direction and its upper circumferential surface is tangentially aligned with the upper surface of pleating platen 44. Pleating platen 44 provides the surface over which an individual food casing 25 is transferred from the supply table 23 to the pleating means 50 at Station II. Advancement of the leading edge of an individual food casing 25 across the pleating platen 44 to the pleating means 50 is arrested by means later described and controlled by means of photoelectric eye 31. In this manner, an individual food casing 25 is supplied to and positioned in the pleating means 50.

It should be understood that the terms "leading edge" or "leading end," as employed throughout this application and in the appended claims, are intended to indicate that portion of the apparatus or article farthest away from the supply table 23 while the terms "trailing edge" or "trailing end" are similarly intended to indicate that portion of the apparatus or article nearest the supply table 23.

In a preferred embodiment of the present invention, lower feed roll 35 is journaled in machine frame 28 (FIG. 4) and upper feed roll 34 is journaled in yoke connecting bars 38 adjacent their trailing ends. Connecting bars 38 are secured to pivot shaft 40 pivotally mounted in machine frame 28. Rolls 34, 35 are provided with mating ridges 46 spaced apart by grooves 45. When rolls 34, 35 are engaged in pressing relationship, ridges 46 firmly secure and align the casing as it is advanced from the supply table 23 to the pleating means 50. The ridges 46 of roll 34 are preferably coated with a material having a high coefficient of friction, such as rubber. Grooves 45 provide a degree of freedom for the two plies of the flattened casing intermediate the roll ridges, thereby preventing wrinkling and lengthwise misalignment of the casing.

Grooves 45 in roll 35 cooperate with curved fingers 43 formed as an extension of the trailing edge of pleating platen 44, to strip the leading edge of casing 25 from roll 35 and prevent casing 25 from slipping beneath the surface of platen 44 as the casing is fed to the pleating means 50. Advance of the food casing 25 from the nip between feed rolls 34, 35 to the pleating means 50 can thereby be accomplished with regularity and accuracy.

As is described in more detail hereinbelow, leading upper feed roll 36 acts as a brake when the casing is arrested in its forward motion and also acts as securing means for the casing 25 when it is being pleated. Therefore, in a preferred embodiment of the present invention (FIG. 4) leading upper feed roll 36 is comprised of a plurality of individual, flat-face, bushed pulleys 39 rotatably mounted on shouldered shaft 41 fixedly secured to connecting bars 38. Pulleys 39 are spaced apart by the bushing portion thereof at a spacing similar to the spacing of ridges 46 on rolls 34, 35. The faces of pulleys 39 are also preferably coated with a friction material such as rubber to brake the casing to a halt at a predetermined position in pleating means 50. A slight braking force is imposed on the pulleys 39 which force is controlled by clamping the pulley bushing interfaces along shaft 41 intermediate the side surfaces of operating bar 38a and setscrew collars 47.

STATION II—APPARATUS

As shown in FIGS. 3d, 5, 6 and 7a, the pleating means 50 comprises a lower forming assembly generally designated by reference numeral 52, and an upper pleating assembly generally designated by reference numeral 62.

The lower forming assembly 52 comprises horizontally disposed plate member 54 having a plurality of forming members 56 extending vertically from the upper surface thereof. Pleating platen 44 is horizontally secured to machine frame 28 and extends from trailing edge fingers 43 to its leading end at pleating means 50. The leading end of platen 44 has a plurality of spaced-apart slots 60 defined therein to accommodate the vertical movement of forming members 56 therethrough. The upper horizontal surface of platen 44 is preferably coated with or fabricated from a material having a low coefficient of friction and should be of sufficient hardness or durability to resist wear.

The upper pleating assembly 62 comprises a movable U-shaped plate member 64, having vertically disposed side sections 65 depending downwardly therefrom. Plunger rod 66 is slideably mounted in bushed hole 68 central of the horizontally disposed portion of plate member 64. The lower end of rod 66 is secured to center pleating blade 76. Compression spring 70 is slideably mounted on rod 66 and is constrained between blade 76 and the bottom side of plate 64. Plunger rod 66 and compression spring 70 are secured in assembly with plate member 64 by flanged head 67.

Figure 7A:
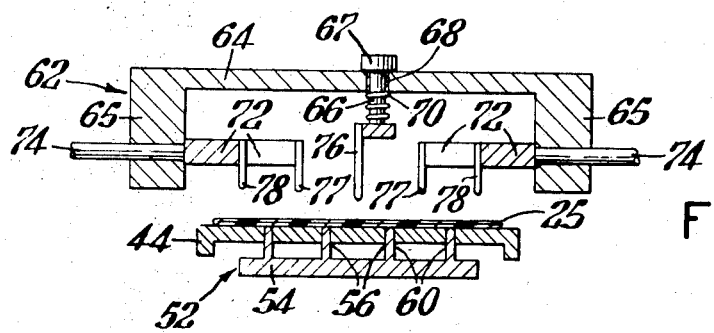

Extending inwardly from the side sections 65 are a plurality of horizontally disposed support members 72. The support members 72 are respectively secured to a plurality of horizontally disposed rods 74 which, in turn, are slideably mounted through side sections 65 of plate member 64 (FIG. 7a).

Center pleating blade 76 vertically depends from the lower extremity of rod 66. Vertically depending from the support members 72 are a plurality of pairs of side pleating blades 77 and 78 which are disposed parallel to and on each side of center pleating blade 76. Center pleating blade 76 is vertically longer than side pleating blades 77 and 78 (FIG. 7a). Side pleating blades 77 are horizontally shorter than and positioned back from the leading and trailing edges of center pleating blade 76 while side pleating blades 78 are horizontally shorter than and positioned back from the leading and trailing edges of side pleating blades 77 (FIGS. 5, 6 and 12).

The leading and trailing edges of all the pleating blades 76, 77, 78 are preferably rounded in order to minimize damage to the casing.

The lower horizontal edges of all the pleating blades, which come into contact with the flattened food casing 25, are preferably coated with a composition which has a high coefficient of friction, such as rubber, in order to insure a firm coaction between them and the end of the casing to be pleated as will become apparent hereinafter.

Although the apparatus depicted in the drawing illustrates a pleating means having only two pairs of side pleating blades, it should be understood that this embodiment is not intended as a limitation. A lesser or greater number of side pleating blades can be employed as desired or required, depending primarily upon the width of the flattened food casing to be pleated. The greater the flat width of the food casing, the greater will be the number of side pleating blades desired or required, while in food casings having smaller flat widths, the converse will prevail.

STATION III—APPARATUS

Illustrated in FIGS. 8 and 9a—9c is the hanger loop forming means 80 which comprises a pair of pinch rolls 82 which feed the hanger loop material 22 to the hanger loop forming means 80. The pinch rolls 82 are controlled by a timer (not shown) so that a predetermined length of hanger loop material 22 is intermittently fed to the hanger loop forming means 80. The pinch rolls 82 also act to guide the hanger loop material 22 over an anvil 84 which has a recessed center and an extension 84a at its leading end. The anvil 84 is, in turn, mounted on base 85 which is secured to machine frame 28. Anvil 84 acts as a support when the material 22 is severed by a severing means 86. The pinch rolls 82 advance the hanger material 22 so that the free end thereof is first trained horizontally into the space intermediate a looping pin 92 and a forming clamp 88 in its retracted position as shown in FIG. 9a. Looping pin 92 is fixedly secured to bracket 93 which, in turn, is fastened to machine frame 28. Forming clamp 88 is comprised of two pairs of V-shaped prongs 89, 89a, extending from a common base block 87. Block 87 is secured to the outboard end of lever arm 90, whose inboard end is secured to clamp pivot shaft 91 rotatably trunnioned in frame 28. When clamp 88 is rotated from its retracted position to its clamping position, as shown in FIG. 9b, by conventional rotary air cylinder means (not shown), the length of hanger loop material 22 is nested in the V-shaped prongs 89, 89a to form a bight in the hanger loop material about looping pin 92, and then prong 89 clamps the two plies of hanger loop material 22 against anvil extension 84a.

Since, in a preferred embodiment the hanger loop material 22 is selected from conventional heat-meltable materials described hereinbelow, the severing means 86 is comprised of a V-shaped knife element 83 heated by a suitable thermostat-controlled electrical current. Knife 83 is secured to lever arm 81 pivotally mounted on machine frame 28 and is advanced and retracted from the anvil 84 to sever the material 22 in a controlled time-and-temperature operation.

Referring now to FIGS. 10a—10c and 11, there is shown a hanger loop transfer means, generally designated by reference numeral 94, equipped with a pair of gripping jaws 96 which are pivotally mounted on a swing plate 98. Gripping jaws are actuated by an air cylinder and linkage (not shown) to grip the plies of the hanger loop 24 intermediate prongs 89, 89a (FIG. 9c). Swing plate 98 is trunnioned on cross carriage 95 which is reciprocated on guideways 97 by securing it to the piston rod of air cylinder 99 mounted on machine frame 28. Swing plate 98 is provided with a geneva motion and gear (not shown) mounted on cross carriage 95, the gear meshing with a gear rack (not shown) affixed to frame 28. As cross carriage 95 is advanced to the hanger loop forming means 80, the gripping jaws 96 first grip the hanger loop 24 intermediate prongs 89, 89a (FIGS. 9c and 10a). Then the cross carriage 95 retracts to first strip the formed hanger loop 24 from pin 92 (FIG. 10b). Subsequently, by means of the geneva motion, swing plate 98 rotates as carriage 95 traverses the clamping means from the hanger loop forming means 80 to the pleating means 50 (FIG. 10c). In this manner, the hanger loop 24 is transferred from the hanger loop forming means 80 and positioned adjacent the pleated end 26 of the casing 25 (FIGS. 10c and 11).

CASING TRANSFER MECHANISM—APPARATUS

A casing transfer carriage mechanism is employed to transfer the casing 25 by its pleated casing end 26 together with the hanger loop 24 from the pleating means at Station II to the clip-forming means 150 at Station IV.

Referring now to FIGS. 13a—13c and FIGS. 14a and 14b, there is illustrated a casing transfer carriage mechanism comprising a vertically disposed carriage member 100 on the upper portion of which is rotatably mounted a pair of clamping jaws 102. The clamping jaws 102 firmly clamp the hanger loop 24 to the pleated casing end 26 after the hanger loop 24 has been positioned adjacent the pleated casing end 26 by the clamping means 94 (FIGS. 10c and 11). The clamping jaws 102 are interconnected to a pair of meshing gears 104 (FIGS. 14a and 14b) one of which is mounted to one end of a crank arm 106. The other end of crank arm 106 is pivotally mounted to an air cylinder 108. Actuation of air cylinder 108, acting through crank arm 106 and gears 104, causes the clamping jaws 102 to rotate toward or away from each other.

Carriage member 100 is reciprocally mounted in the apparatus by means of a pair of grooved guide rollers 110 mounted at each end of the carriage member 100 (FIGS. 13a—13c). Guide rollers 110 are, in turn, mounted to mate with cooperating guide bars 112 fastened to frame 28. An endless roller chain 114 is trained about two pairs of sprockets 116 and 118. Sprockets 116 are rotatably mounted to the frame of the apparatus 28 adjacent the pleating means 50 at Station II and are vertically disposed with respect to each other. Sprockets 118 are similarly rotatably mounted adjacent the clip closure means 150 at Station IV. A cam follower 120 is secured to endless chain 114 so as to traverse in vertical guideway 122 which is fixedly secured to carriage member 100.

A dual air manifold block 124 having upper manifold 126 and lower manifold 128 is vertically mounted to carriage member 100 and is aligned with the direction of travel of the carriage member 100 (FIGS. 14a and 14b). Upper and lower manifolds, 126 and 128, are each equipped with a female section of an airhose coupling containing a check valve. An airhose 130 connects upper manifold 126, through its port 127, to the rod end of air cylinder 108 while airhose 132 connects lower manifold 128, through its port 129, to the piston end of air cylinder 108.

A first manifold block 134 (FIG. 13a) is vertically mounted to the apparatus frame 28 adjacent the pleating means 50 at Station II. Male airhose coupling sections 135 and 136 equipped with check valves are affixed to manifold block 134 and aligned to cooperate with the female coupling sections in the upper and lower manifolds 126 and 128, respectively, of dual air manifold 124.

A second manifold block 138 (FIG. 13c) is similarly vertically mounted to the apparatus frame 28 adjacent the clip closure means 150 at Station IV and has affixed thereto male airhose coupling sections 139 and 140, also equipped with check valves, which are aligned to cooperate with female coupling sections in manifolds 126 and 128, respectively, of dual air manifold 124.

Stated in another way, female hose-coupling section in upper manifold 126 of dual air manifold block 124 is aligned to engage male hose-coupling sections 135 and 139 of manifold blocks 134 and 138, respectively, while female hose-coupling section in lower manifold 128 is aligned to engage male hose-coupling sections 136 and 140 of manifold blocks 134 and 138, respectively.

By means of this mechanism, the pleated casing end 26 together with the hanger loop 24 positioned adjacent thereto are gripped at Station II and then transferred to the clip-forming means 150 at Station IV before subsequently being released from the gripping means after the closure is made.

STATION IV—APPARATUS

Figure 15A:
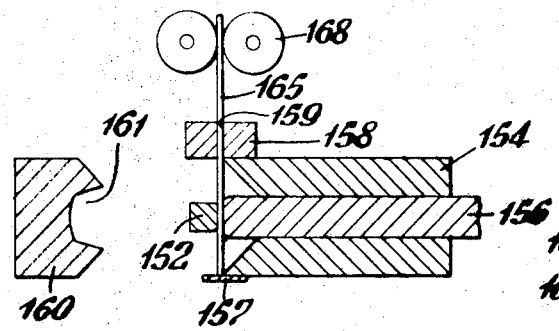

The pleated casing end 26 together with the hanger loop 24 are indexed at the clip closure-forming means 150 of Station IV. As shown in FIG. 15a, the clip closure-forming means 150 comprises a clip die 152 fabricated in the form of a solid, rectangular bar having rounded corners at one side. Directly opposite the rounded corners of the clip die 152 there is positioned a movable clip die 154. The ends of movable clip die 154, which are adjacent to and directly opposite the rounded corners of clip die 152, are each machined at an angle which extends inwardly toward the body of movable clip die 154 defining a horizontal V-groove. Extending along the entire longitudinal axis of movable clip die 154 is a guideway 155 (FIGS. 15e and 15d) in which a clip ram 156 is slideably mounted. The corners at one end of clip ram section 156 are also rounded and are positioned directly opposite the rounded corners of clip die 152 and adjacent the angled ends of movable clip die 154. A clip wire guide 158, fabricated from a solid rectangular bar having a borehole 159, is positioned adjacent the apex of one angled end of movable clip die 154 so that the edge of the borehole 159 is aligned with the corner of the angled end of movable clip die 154 adjacent thereto. As shown in FIG. 15a, a pair of pinch rolls 168 are aligned with borehole 159 of clip wire guide 158 and are adapted to feed the clip wire 165 from a supply reel 164 (FIG. 1) to be positioned adjacent the clip die 152. The pinch rolls 168 are controlled by a timer (not shown) so that a predetermined length of clip wire 165 is intermittently fed through borehole 159 and past the rounded corners of clip die 152. Adjacent the other angled end of movable clip die 154 there is positioned a wire stop plate 157 which arrests the advance of clip wire 165 as it is guided through borehole 159 and positioned adjacent the rounded corners of clip die 152.

On the other side of clip die 152, there is positioned a clip-closing die 160. The face of clip-closing die 160 nearest clip die 152 is angled at each side end thereof to mate with the inside surfaces; that is, the horizontally disposed V-groove, of the angled ends of movable clip die 154. The face of the clip-closing die 160, between its angled side ends, is machined in the form of a slot 161 in order to receive a wire clip section 166 (FIG. 15e) severed from the clip wire 165. As can be seen in FIG. 15a the rear wall of the slot 161 is machined to have a concave rear wall and sidewalls extending at an angle outwardly therefrom to the face of the clip-closing die 160.

APPARATUS DRIVE MECHANISM

Referring now to FIG. 16, there is illustrated one embodiment of a drive mechanism that can be employed to energize the apparatus used in the present invention.

As shown in FIG. 16, a main drive motor 200 has mounted to its shaft 201 an electrical clutch 204 and an electrical brake 206. The output end of shaft 201 is connected to a first speed reducer 202 by means of an endless chain and sprocket drive 208. The through shaft 203 of speed reducer 202 is connected to a speed reducer 210 equipped with output shaft 211. At the other end of output shaft 211 there is rotatably mounted a crank 212 which is connected to the stacking means and which activates rotating clamps 170 (FIG. 1) through pin 215, rotatably mounted link arm 216, shaft 217, right-angle speed increaser 218 and rotating shaft 219 to which rotating clamps 170 (FIG. 1) are mounted.

At the other end of second speed reducer 210, through shaft 203 connects second speed reducer 210 in tandem with third speed reducer 220.

At the other side of second speed reducer 210, shaft 221 connects second speed reducer 210 with right-angle drive 223. Right-angle drive 223 is, in turn, connected to a control box 224 through shaft 225. Control box 224 contains a plurality of electrical switches operated by rotating cams (not shown) mounted on a common shaft which is driven by shaft 225, so that various operations and functions of the apparatus are synchronized and controlled as is described in more detail hereinbelow.

A main camshaft 226 is mounted to third speed reducer 220. One end of a first roller chain and sprocket drive 227 is mounted on main camshaft 226 adjacent third speed reducer 220. The other end of chain and sprocket drive 227 is mounted to one end of clutch shaft 231 of electric clutch 230. At the other end of main camshaft 226 there is mounted one end of a second chain and sprocket drive 229 whose other end is mounted to shaft 241 of cam 240. Intermediate chain and sprocket drives 227 and 229 mounted on main camshaft 226, are a plurality of cams 228 which mechanically actuate the vertical motions of the pleating means 50.

As described above, the other end of chain and sprocket drive 227 is mounted to one end of clutch shaft 231 of clutch 230. At the other end of clutch shaft 231 an endless chain and sprocket drive 233 is mounted to connect clutch 230 with a fourth speed reducer 234 through shaft 235. Mounted on the end of shaft 235 is one-way clutch 196 which in turn, mounts handcrank 198. The handcrank 198 and clutch 196 are employed to manually lower casing supply table 23. Fourth speed reducer 234 is provided with a shaft 236 which is connected to one end of shaft 232a by means of endless chain and sprocket drive 237.

Fourth speed reducer 234 is also connected to shaft 232c by means of chain and sprocket drive 238 and shaft 247. Chain and sprocket drives 239a connect shafts 232a and 232b to each other while chain and sprocket drives 239b connect shafts 232c and 232d to each other. Shaft 236 is driven in a counterclockwise direction while shaft 247 is driven in a clockwise direction so that chain and sprocket drives 239a and 239b are driven in the direction shown by the arrows. Through this mechanism, supply table 23 is energized and controlled in its intermittent vertically upward movement.

Referring again to endless chain and sprocket drive 229, it was pointed out above that one end was mounted to one end of main camshaft 226 while the other end was mounted to shaft 241 of cam 240. Cooperating with cam 240 is a cam follower 243 which is in constant contact with the perimeter of cam 240.

Cam follower 243 is connected to one end of shaft 244 by link 242. Mounted on shaft 244 are a pair of crank arms 246 which rotatably support mounting bar 246a to which vacuum cups 32 are mounted. A tension spring 245 is connected to link 242 intermediate its ends and acts to maintain cam follower 243 in firm engagement with cam 240. A chain and sprocket drive 144 is arranged to maintain mounting bar 246a in horizontal alignment as it is rotated about shaft 244. The sprocket on the inboard end of crank arm 246 is journaled on shaft 244 and the sprocket is fixed in position by bracket 146 secured to machine frame 28. The sprocket on the outboard end of crank arm 246 is fixed to an extension of the shaft journaling mounting bar 246a in crank arms 246.

With reference again to third speed reducer 220, drive energy is transmitted therefrom by through shaft 203, right-angle drive 248, through shaft 249, right-angle drive 250, connecting shaft 251, right-angle drive 252 and connecting shaft 253 to drive lower feed roll 35 continuously in a clockwise direction.

Right-angle drive 250 is also equipped with a connecting shaft 255 to which is mounted an electrical clutch-brake 254. Electrical clutch-brake 254, by means of connecting shafts 256, 257 and right-angle drive 258, is connected to the endless chain 114 and sprockets 116 and 118 which comprise the drive means of the casing transfer mechanism (FIGS. 14a and 14b).

STATION I—OPERATION

The operation of the apparatus at Station I can be more readily understood when taken together with FIGS. 1, 2, 3d and 16 of the drawing.

As shown in FIGS. 1 and 2, a stack of cut, flattened, tubular food casings is positioned on the supply table 23 while the leading end of hanger loop material 22 is trained over guide rolls 21a and 21b from the supply reel 20 and fed between the pinch rolls 82 of hanger loop forming means 80 while clip wire 165 is fed from the supply reel 164 through wire pinch rolls 168 to be positioned in the clipping means 150. The main drive motor 200 is then started energizing the drive components of the apparatus (FIG. 16).

Before startup, supply table 23 is lowered manually to accept the stack of food casings, by cranking handcrank 198 through one-way clutch 196 to the input shaft 235 of the fourth speed reducer 234. At startup, supply table 23 is urged upwardly by chain and sprocket drives 239a and 239b (FIG. 16) until the top of the stack of casings 25 attains the pickup level whereupon the light beam of photoelectric eye 30 is intercepted and controls to disconnect electric clutch 230. Speed reducer 234 is a worm gear reducer capable of being operated only by its input shaft 235 and thus when clutch 230 is inoperative, supply table 23 is locked or maintained in feed pickup position. When the number of casings removed from the top of the stack falls below the pickup level, the light beam trips the photoelectric control 30 and clutch 230 is reenergized thereby mechanically reconnecting the machine drive from main camshaft 226 through chain and sprocket linkages 227 and 233 to speed reducer 234, thereby raising the table to the pickup level, whereupon the casing stack again intercepts the light beam.

Figure 3A:
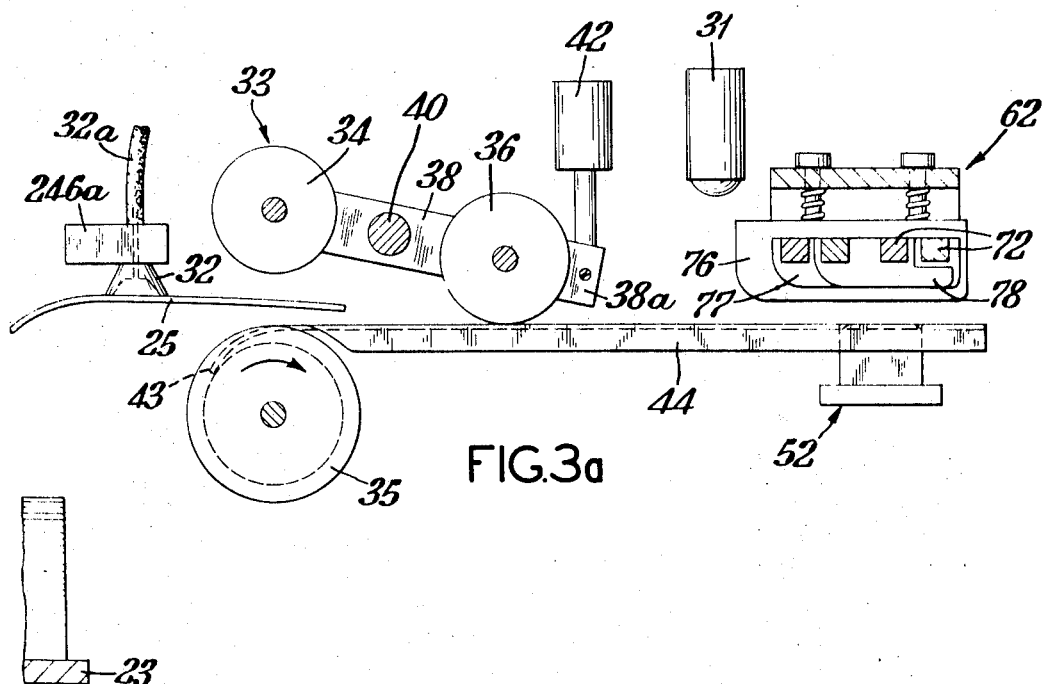

With reference to FIG. 16 vacuum cups 32 are raised and lowered once in each cycle of apparatus operation by means of main camshaft 226 acting through chain and sprocket drive 229 to shaft 241 of cam 240 cooperating with cam follower 243 and link 242 connected to shaft 244 to which levers 246 are mounted. The levers 246 rotatably support mounting bar 246a to which the vacuum cups 32 are secured. When shaft 244 is rotated by link 242, levers 246 are caused to move through an arc of about 90 and, by coaction of roller chain and sprocket drive 144, mounting bar 246a and vacuum cups 32 are caused to move in parallel relationship to the top surface of the stack of casings 25. Vacuum cups 32 thus lift the uppermost casing 25 and insert its leading edge between lower feed roll 35 and trailing upper feed roll 34 (FIG. 3a). Lower feed roll 35 is continuously driven in a clockwise direction from the main drive motor 200 acting essentially through speed reducers 202, 210 and 220, right-angle drives 248, 250 and 252 and shafts 203, 249, 251 and 253.

Referring now to FIGS. 3a—3d, the leading end of food casing 25 trips a feeler switch (not shown) as it is positioned between trailing upper feed roll 34 and lower feed roll 35 and thusly actuates air cylinder 42 and a valve (not shown) that interrupts the vacuum to vacuum cups 32. Actuation of air cylinder 42 causes trailing upper feed roll 34 to oscillate downwardly and firmly engage the leading end of food casing 25 between it and lower roll 35 (FIG. 3b), thereby stripping the casing from the vacuum cups 32. Food casing 25 is thusly advanced over pleating platen 44 toward the pleating means 50 at Station II (FIG. 3c). As the food casing 25 advances toward the pleating means 50, photoelectric eye 31 senses the advance of the leading end of food casing 25 and transmits an electrical signal through a conventional time delay and electropneumatic valve (not shown) that controls cylinder 42 which is then reversed. Reverse action of the air cylinder 42 causes leading upper feed roll 36 to oscillate downwardly and trailing upper feed roll 34 to oscillate upwardly through connecting bar 38 acting about pivot shaft 40. At the extremity of its downward movement, leading upper feed roll 36 firmly engages the body of the food casing 25 between it and pleating platen 44 and thusly brakes the advance of the casing. The leading end of food casing 25 is thusly positioned in the pleating means 50 ready to be pleated (FIG. 3d).

STATION II—OPERATION

Once the leading end of food casing 25 is positioned in the pleating means 50 between the lower forming assembly 52 and the upper pleating assembly 62, as is shown in FIGS. 5, 6 and 7a, the pleating operation is ready to begin.

Figure 7B:
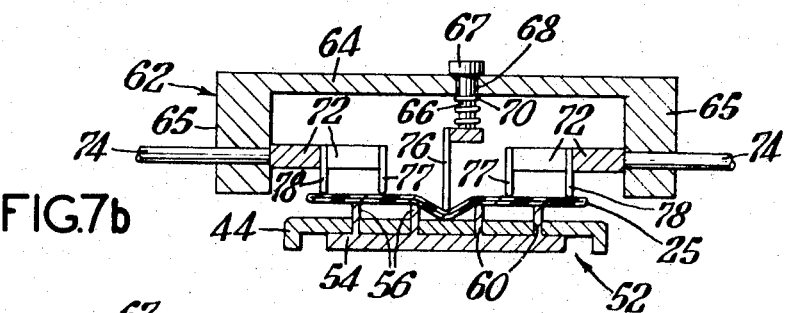
Figure 7C:
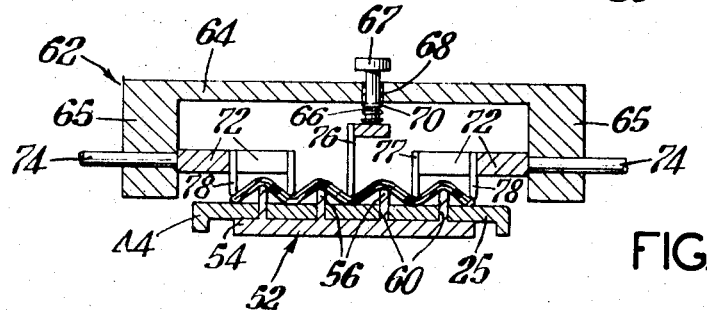
Figure 7D:
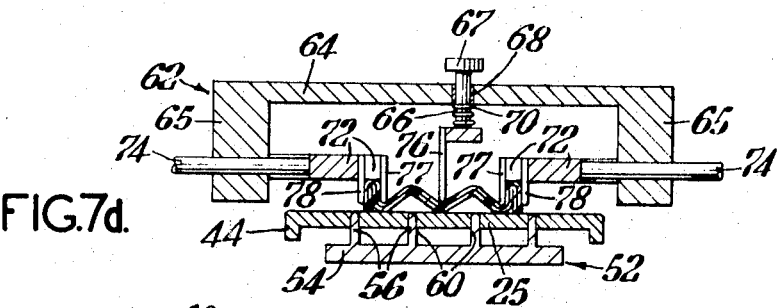
Figure 7E:
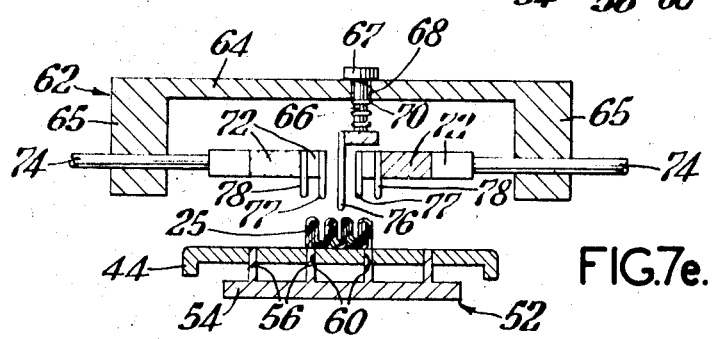

The sequence followed in pleating one end of the food casing 25 is illustrated in FIGS. 7a—7e. As shown in FIG. 7a, the leading end of the thusly positioned food casing 25 is over the lower forming members 56 and rests on the upper surface of platen 44 which acts as a work surface. Plate 54 is then raised by appropriate linkage (not shown) actuated by cams 228 mounted on main camshaft 226 (FIG. 16) thereby raising the food casing 25 from the surface of platen 44 and causing it to be supported solely by the lower forming members 56. The upper pleating assembly 62 is then lowered by appropriate linkage (not shown) actuated by cams 228. The upper pleating assembly 62 is lowered until the center pleating blade 76, firmly clamps the central portion of food casing 25 to the upper surface of platen 44 between adjacent lower forming members 56 as shown in FIG. 7b. Upper pleating assembly 62 is then lowered still further until the pairs of side pleating blades 77 and 78 also clamp the food casing 25 to the upper surface of platen 44 between respectively adjacent lower forming members 56 forming a wave pattern or loosely formed, undulating shape across the width of the food casing 25 (FIG. 7c). During this time, center pleating blade 76 is retained in its position by means of the coil spring 70 which is compressed between center blade 76 and plate 64. The lower horizontal edges of the pairs of side pleating blades 77 and 78, as well as the lower horizontal edge of center pleating blade 76 are now all clamping the food casing 25 to platen 44. Plate 54 is now retracted through the further actuation of cams 228 (FIG. 16), as described hereinbefore, thereby lowering the lower forming members 56 to a position at least flush with the working surface of platen 44. The food casing 25 is now clamped solely to the upper surface of platen 44 by the pleating blades, while the wave pattern is retained across the width of the food casing by the pleating blades (FIG. 7c). Next, the pair of side pleating blades 78 are actuated to move transversely across the width of the food casing 25 through rods 74 each acting respectively on horizontal mounts 72 from which side pleating blades 78 vertically depend, thereby condensing and compressing the first formed wave pattern toward the central blade 76. Conventional pneumatic means (not shown) connected to rods 74 are energized by limit switches in control box 224 for this function. In this manner, the first pleats on each lateral side of the casing between each pair of side pleating blades 77 and 78 are formed as shown in FIG. 7d. Next, the pair of side pleating blades 77 are similarly actuated as blades 78 continue to advance inwardly, traversing the width of food casing 25 to form subsequent pleats in the food casing 25 between each of the side pleating blades 77 and center pleating blade 76. Hence, pleats are continuously and sequentially formed in the food casing 25 inwardly toward its center beginning first with forming pleats at each of the lateral side edges of the food casing before subsequent, interior pleats are formed. Formation of the pleats in this manner is accomplished without firmly clamping the pleats between adjacent pleating blades so that the pleating blades can be subsequently readily withdrawn without disturbing the formed pleats (FIG. 7e).

The height of each pleat formed can be readily controlled by making slight modifications and adjustments in the pleating blades and/or the forming members. For example, higher or lower pleats can be made as required or desired by altering the distance between the pleating blades, or controlling the vertical upward movement of plate 54 which, in turn, determines the distance the lower forming members 56 will protrude above the upper surface of plate member 58, or by altering the height of the lower forming members 56, or by altering the height of the pleating blades, or by various combinations thereof which will become apparent to those skilled in the art.

The leading and trailing edges of the side pleating blades 77 and 78 are set progressively back from the leading and trailing edge of the center pleating blade 76 (FIGS. 3d, 5 and 12) to facilitate the orderly gathering of the flat casing plies into pleated relation without humping, wrinkling or tearing the casing rearward of the trailing edges of the pleating blades. Through the operation of the pleating means, the pleating blades are capable of pleating the food casing more uniformly thereby also minimizing possible injury to the food casing during pleating.

Surprisingly it has been found that pleated food casings of the present invention exhibited a lower incidence of breakage than pleated food casings obtained from commercially available pleating apparatus. It is believed the lower incidence of breakage results from the unique characteristics of the pleats. It was observed that the formed pleats had alternate crests 29 and troughs 27 which differ from each other in that the troughs 27 were rounded while the crests 29 were formed into sharp apexes (FIG. 10c). Pleats formed in food casings by commercially available pleating apparatus were observed to have definite sharp points at the apex of both the troughs and crests of the pleats which is believed to contribute to a higher incidence of breakage in such pleated casings. The pleating assembly used in the present invention, on the other hand, produces pleated food casings which exhibit a lower incidence of breakage.

With the pleating assembly used in the present invention, predetermined wave patterns can be formed in the food casing from which pleats of controlled size can be obtained. Thusly, pleats of similar size or varying size can be readily formed by simple adjustments and manipulation of the pleating blades and corresponding adjustments and manipulation of the other components of the pleating assembly.

STATION III—OPERATION

While the pleating operation is in progress, the hanger loop 24 is simultaneously being formed at the hanger loop forming means 80 (FIG. 1).

While the material selected to form the hanger loop is not critical, it has been found that a highly oriented, thermoplastic, heat-meltable tape, such as that commercially employed to band cartons and boxes, provides a good hanger loop and this type of material is preferred.

The thermoplastic, heat-meltable material employed should be capable of withstanding temperatures of between 190° F.–220° F., during curing cooking and processing while supporting the weight of the encased food product. It should also be capable of having a "bead" readily formed therein. Formation of a bead in the hanger loop is desirable since the bead will be placed to coact with the wire clip section to form an anchoring means by which the stuffed food casing can be securely suspended. Further reference to the term "bead" throughout this application and in the claims, therefor, is intended to refer to and should be understood as referring to that portion of a hanger loop which has been formed to coact with a wire clip section so as to provide an anchoring means for the hanger loop by which a stuffed food casing is suspended.

The hanger loop tape employed in a preferred embodiment of the present invention is rectangular in cross section and is one which has been oriented in one direction; that is, along its length, to assure that the desired strength is obtained. Due to the orientation of the hanger loop tape, a bead can be readily obtained in its severed ends by employing a melt cutoff knife as the severing means.

As described hereinabove, the melt cutoff knife 86 (FIGS. 9a to 9c) has a V-shaped blade 83 which can be heated and, in use, severs the tape by advancing it to and through the tape by melting it at its point of contact with the tape. By adjusting the penetration, temperatures and shape of the blade sides 83 of the cutoff knife, the size and shape of the beads 22a, 22b, formed in the thermoplastic hanger loop material 22 can also be adjusted as desired.

It should be understood that, while one type of hanger loop tape has been described for use in a preferred embodiment of the present invention, other types of hanger loop materials can also be readily employed to function in the same manner. For example, hanger loop materials which are channeled or U-shaped in cross section, or which have raised portions or teeth along their length can also be used. When the hanger loop material is channeled or U-shaped in cross section, attachment of the wire clip section so as to deform the tape will suffice to form a bead and provide an anchoring means. Formation of a bead in hanger loop materials having raised portions or teeth along their length can be obtained by severing the material through its raised portion and attaching the wire clip so that it coacts with the raised portion of the tape providing an anchoring means by which the stuffed food casing can be suspended.

Obviously, other materials such as preformed or pretied string loops, wire, metal tape, filaments and the like, having various cross-sectional configurations can also have beads formed therein to provide an anchoring means and their use is not precluded herein.

Turning now to FIG. 9a, a length of hanger loop material 22 is supplied through pinch rolls 82, passed over anvil 84 and extended beyond the prongs of forming clamp 88. Forming clamp 88 is shown in its starting or open position in alignment with anvil 84 and mounting base 85. The pinch rolls 82, which automatically feed the material 22, are energized intermittently through conventional connecting means to the drive means of the apparatus synchronized by control box 224 so that only a predetermined length of material 22 is supplied. Usually, the length of hanger loop material delivered to the forming clamp 88 is about 8 inches in length.

Once the hanger loop material 22 is in position on the anvil 84 and extended horizontally into the space intermediate looping pin 92 and forming clamp 88, lever arm 90 that mounts clamp 88 is rotated about pivot shaft 91 by actuation of a rotary pneumatic cylinder and linkage means (not shown). As shown in phantom in FIG. 9a, V-shaped prongs 89, 89a engage the leading end of hanger loop material 22 and bend it about looping pin 92 forming a bight or loop in tape 22. Clamp 88 continues to rotate about shaft 91 and prong 89 continues to bend the leading end of the material 22 about pin 92, and thereby reverses it onto the trailing end of hanger loop material 22 (FIG. 9b) until prong 89 clamps both the leading and trailing ends of hanger loop material 22 against the anvil extension 84a.

When the hanger loop material 22 is thusly clamped across the anvil 84, severing means 86 is advanced downwardly by an air cylinder and linkage (not shown) to sever the hanger loop material 22 (FIG. 9c) resulting in formation of a hanger loop 24. Anvil 84 acts as a support for the material 22 between pinch rolls 82 and clamp prong 89. The anvil's central recessed portion permits the blade 83 of severing means 86 to advance through the hanger loop material 22 until stopped by surface 85.

Since, in a preferred embodiment of the present invention, the hanger loop material 22 is a thermoplastic, heat-meltable material, the severing means 86 is preferably a V-shaped melt cutoff knife. The V-shaped blade 83 of the melt cutoff knife 86 is heated to a controlled predetermined temperature by conventional electrical means (not shown). Knife 86 is positioned so that it severs only one ply of material 22. In use, the blade 83 is first advanced to contact and sever the material by melting it. As knife 86 is further advanced, the severed ends are further melted back by the sloping sides of blade 83 to form beads 22a and 22b. In this manner, beads 22a and 22b are formed in each of the severed ends of the hanger loop 24; that is, the trailing end of the formed hanger loop 24 has a bead 22b while the leading end of the hanger loop material 22 also has a bead 22a (FIG. 9c). Hence, as the leading end of the hanger loop material 22 is rotated to form the next successive hanger loop, one of its ends has already had a bead 22a formed in it. Once the hanger loop 24 has been formed, the beaded ends 22a, 22b, are permitted to cool or, alternatively, can be cooled by directing a jet of air on them.

Control box 224 now actuates the hanger loop transfer means 94 shown in FIGS. 10a, 10b, 10c and 11. A pneumatically actuated air cylinder reciprocates the transfer means 94 across the apparatus toward the hanger loop forming means 80. At the end of the traversing movement of transfer means 94, gripping jaws 96 are pneumatically actuated to close and grip the hanger loop 24 intermediate its beaded ends 22a, 22b and its closed loop end as shown in FIG. 9c. The melt cutoff knife 86 is then retracted to its starting position and the forming clamp 88 is counterrotated and returned to its starting position, as shown in FIG. 9a. The hanger loop 24 is then withdrawn from the hanger forming means 80 which is then ready to form the next hanger loop.

The hanger loop 24 is transferred by the gripping jaws 26 on transfer means 94 toward the pleated casing end 26. During this transfer, transfer means 94 is pneumatically actuated to first strip the hanger loop 24 from the looping pin 92 (FIG. 10b) and is then rotated through a 90° arc (FIGS. 10b and 10c) coincidentally with the transfer of the hanger loop 24 to a position adjacent the pleated casing end 26. In this position, the closed end of the hanger loop 24 extends beyond the leading edge of the pleated casing end 26 (FIGS. 11, 12). Once the hanger loop 24 has been thusly positioned, the clamping jaws 102 of the transfer carriage mechanism are activated to securely engage the pleated casing end 26 and the hanger loop 24 positioned adjacent thereto and maintain them together in this position as illustrated in FIGS. 11, 12, and 13a. The gripping jaws 96 of the hanger loop transfer means 94 are then disengaged from the hanger loop 24, as shown in phantom in FIG. 14a. The hanger loop transfer means 94 is then reciprocated and rotated back to its original position at Station III. At this time, the casing 25 appears as illustrated in FIG. 12 with the pleated casing end 26 and hanger loop 24 firmly clamped together by the clamping jaws 102 and with the pleating blades 76, 77 and 78 still retained in position in the formed pleats. Now, the leading upper feed roll 36 (FIGS. 3b, 3c) is disengaged from the trailing end of the casing 25 and the pleating blades 76, 77 and 78 are withdrawn from the pleats so that the casing 25 with the hanger loop 24 securely positioned to the pleated casing end 26, can be traversed from Station II along the longitudinal axis of the apparatus and indexed at Station IV (FIG. 1). During this transfer, the upper end of the clamping jaws 102, protrude above the split connecting work surface 48 so that the body of the casing 25 is supported by the split connecting work surface 48 during transit between Stations II and IV (FIG. 1).

TRANSFER CARRIAGE MECHANISM—OPERATION

As pointed out hereinabove, the means employed to transfer the pleated casing 25 by its pleated end 26 and hanger loop 24 to Station IV is accomplished by the transfer carriage mechanism illustrated in FIGS. 13a—13c, 14a, 14b and 16.

As can be seen in FIGS. 13a and 16, carriage member 100 is alternately indexed at Stations II and IV (FIG. 1) by being traversed over guide bars 112 on guide rollers 110 by endless chain 114 and sprockets 116 and 118. Endless chain 114 is driven in one direction and controlled by electrical clutch-brake 254 which is energized from the main drive motor 200. Sprockets 116 and 118 are positioned on the apparatus frame 28 so that the cam follower 120 automatically indexes the transfer carriage 100 at the pleating means 50 of Station II and the clip closure means 150 of Station IV. Each pair of sprockets 116 and 118 are respectively vertically spaced so that cam follower 120 on endless chain 114 can be linearly stopped at any point vertically intermediate either of the pairs of sprockets 116 or 118 without affecting proper indexing of carriage member 100 at either Station II of Station IV.

When carriage member 100 is indexed adjacent the pleating means 50 at Station II, male couplings 135 and 136 are mated together with the female couplings in manifolds 126 and 128, respectively (FIG. 13a). Mating of the couplings opens the check valves in both the male couplings 135, 136 and the female couplings 126, 128.

Prior to the mating of male couplings 135 and 136 with the female couplings in manifolds 126 and 128, respectively, and while carriage member 100 is in transit from Station IV to be indexed at Station II, clamping jaws 102 are in an open position as shown in phantom in FIG. 14a. Before this time, upper manifold 126 in dual air manifold block 124 has been pressurized and lower manifold 128 exhausted by means of an electrically actuated four-way valve (not shown) which caused air cylinder 108 to retract.

When the carriage member is indexed at Station II and the clamping jaws 102 are to be closed, the four-way valve is actuated by a signal from control box 224 causing the airflow in dual air manifold block 124 to be reversed thereby advancing air cylinder 108 so that the clamping jaws 102 close and firmly clamp the pleated casing end 26 and hanger loop 24 therebetween (FIGS. 13a and 14a).

Carriage member 100 is now ready to be traversed toward and indexed at Station IV. At this time, male couplings 135 and 136 are disjoined from female couplings in manifolds 126 and 128 respectively, and the check valves in each coupling close to retain air in the cylinder 108 so that the pleated casing 26 and hanger loop 24 are secured in the clamping jaws 102. At this point, the apparatus appears as shown in FIG. 13b.

The pleated casing end 26 and hanger loop 24 are thusly positioned at the clip closing means 150 of Station IV (FIGS. 1 and 14b) ready for the next operation.

STATION IV—OPERATION

The sequential operation of the clip closure means 150 will be more clearly understood when considered together with FIGS. 1 and 15a—15f.

A length of clip wire 165 is intermittently supplied by wire pinch rolls 168 from supply reel 164 and guided through borehole 159 in the clip wire guide 158 to wire stop plate 157 in the same manner as described hereinabove for advancement of the hanger loop material.

Figure 15D:
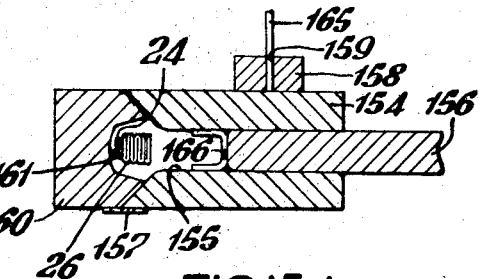
Figure 15B:
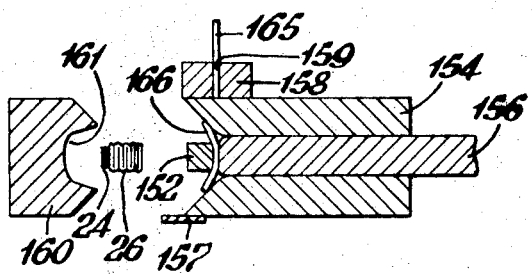
Figure 15E:
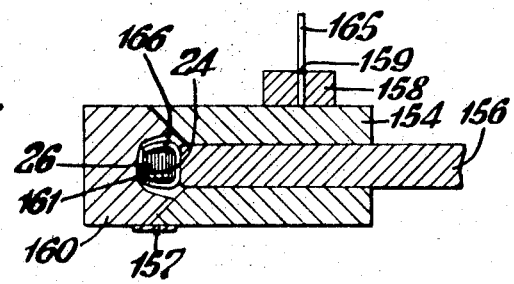
Figure 15C:
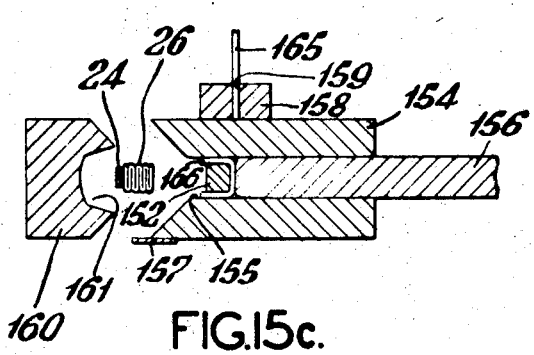

Once the predetermined length of clip wire 165, is in position in clip closure means 150 (FIG. 15a), the movable clip die 154 is energized by pneumatic means (not shown) to slide and advance toward the thusly positioned length of clip wire 165. The angled corner of movable clip die 154 adjacent the wire clip guide 158 coacts with wire clip guide 158 to sever a length of clip wire 165 at this point to form wire clip section 166. During this time, clip die 152 and clip ram section 156 remain stationary while the sliding movement continues to advance movable clip die 154. The coaction of the angled corners of movable clip die 154 advancing against the ends of wire clip section 166, forces these ends to bend until the end portions of the wire clip section 166 are bent about the rounded corners of clip die 152 as shown in FIG. 15b. This bending action continues until wire clip section 166 is bent into a U-shape (FIG. 15c). Advance of movable clip die 154 is now interrupted, and clip die 152 is withdrawn. As pointed out above, the pleated casing end 26 together with the hanger loop 24 had already been positioned adjacent slot 161 of clip-closing die 160 as can be seen in FIG. 15b. The advance of movable clip die 154 now continues until the angled corners of movable clip die 154 mate with the angled side edges of clip-closing die 160 as shown in FIG. 15d.

Clip ram section 156 is now activated to advance in the slot 155 of movable clip die 154 thereby pushing against the closed end of the U-shaped wire clip section 166 forcing the leading ends of wire clip section 166 about the pleated casing end 26 and hanger loop 24 and into contact with the angled sidewalls of slot 161. As the clip ram section 156 continues to advance, the leading ends of U-shaped wire clip section 166 are shaped and bent toward each other by the angled sidewalls and concave rear wall of slot 161 as shown in FIG. 15e. In this manner, the leading free ends of wire clip section 166 are forced toward each other about the pleated casing and hanger loop until wire clip section 166 completely encircles the pleated casing end 26 and the hanger loop 24, thereby completing the wire clip closure in the pleated casing end 26 and simultaneously fixedly securing the hanger loop 24 to the pleated casing end 26 as illustrated in FIG. 15f.

Figure 15F:
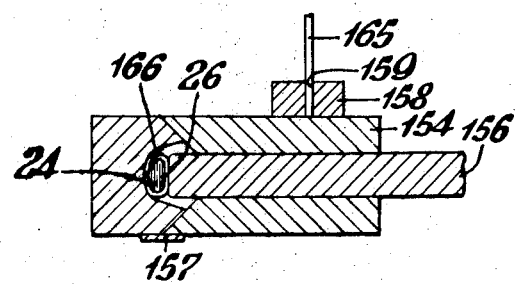

The clip-closing operation is now complete and the apparatus appears as shown in FIG. 15f. Clip ram section 156 and movable clip die 154 are returned to their starting positions and clip die 152 is repositioned so that the clip closure-forming means 150 is ready to form and affix a wire clip section 166 to the next pleated casing end 26.

Automatic removal of the closed casing from the apparatus is not critical and can be accomplished by any means well known to those skilled in the art. For example, as shown in the embodiment depicted in FIGS. 1 and 16, a pair of rotatably mounted gripping clamps 170, actuated by control box 224 and energized from main drive motor 200, can be synchronized to automatically grip the closed casing and transfer it to a collection point or deliver it into a stacking means.

Prior to removal of the thusly closed casing with the clamps 170, the four-way valve (not shown) in the transfer carriage mechanism is activated so that upper manifold 126 is pressurized and lower manifold 128 exhausted thereby reversing the action of air cylinder 108 (FIGS. 13c and 14b). This causes the clamping jaws 102 to open, releasing the pleated casing end 26 and the hanger loop 24, thus leaving the closed casing free to be removed from the apparatus.

The wire clip section 166 is affixed adjacent the pleated casing end 26 and intermediate the loop end and the beaded ends 22a, 22b of hanger loop 24 resulting in a combination looped hanger closure that provides an anchoring means between the beaded ends 22a, 22b of the hanger loop 24 and the wire clip section 166 when a stuffed casing is later suspended by the hanger loop. In a preferred embodiment of the present invention, wire clip section 166 is also positioned about the hanger loop 24 and the pleated casing end 26 so that the closed ends of the wire clip section 166 mate with each other and press against the surface of hanger loop 24. In this manner, the hanger loop 24 acts as a cushion to protect the casing from being torn, cut or otherwise damaged by the cut edges of the wire clip section 166 as is illustrated in FIG. 17.

The material employed to form the wire clip section is not critical and can be selected from such materials as aluminum, plastics, steel, metallic alloys and the like, provided the materials are capable of being suitably formed into and function in a manner similar to that described hereinbefore. Similarly, the cross-sectional configuration of the clip wires employed is also not critical and clip wires having circular, oval, U-shaped, triangular, square, or rectangular cross sections and the like can be readily employed.

In order to facilitate packaging of the food casings, the hanger loop can be positioned at the pleated casing end so that the closed end of the hanger loop extends toward the trailing end of the food casing. After the food casing has been stuffed with a food item, the closed end of the hanger loop can be manually reversed toward the leading end of the stuffed food casing and the food product readily suspended thereby. It may also be desirable to position the hanger loop adjacent the pleated end of the food casing so that the ends of the hanger loop straddle the pleated casing end of the food casing, with the ends of the hanger loop placed on opposite sides of the pleated end.

The wire clip can also be affixed about the hanger loop and the pleated end of the food casing so that the free ends of the wire clip mate with or butt each other, or overlap each other, or wrap further around the pleated end of the food casing and the hanger loop.

By way of illustrating the present invention, a regenerated cellulose casing having a fibrous web embedded therein and having a flat width of 6 5/16 inches and 24 inches in length was pleated, affixed with a thermoplastic hanger loop and closed with a wire clip section.

The flat width of one end of the casing was first formed into a wave pattern of six, loose, undulating waves of about one-fourth inch in height and ⅞-inch spacing from crest to crest. The wave shape was then loosely formed into about six ½-inch high pleats having a combined thickness of about eleven-sixteenths inch.

A length of about 7 inches of oriented polypropylene thermoplastic tape, 0.025-inch thick by ⅜-inch width, was melt-severed from its supply to provide beaded ends therein, each bead being about 0.075 inch in diameter and looped to form a hanger loop. The hanger loop was positioned adjacent the pleated casing end and was clamped thereto by the clamping jaws 102 of the apparatus to a combined thickness of about one-eighth inch before being indexed at the clipping station. An aluminum wire clip section one-eighth inch in diameter and having a modulus of elasticity of $10.6 \times 10^6$ pounds per square inch was formed by cutting off a 1⅝-inch length of the aluminum wire from its supply. The wire clip section was then secured about the pleated casing and hanger loop at a distance of about 1 inch from the casing's end with the ends of the wire clip section mating adjacent the surface of the hanger loop.

Food casings pleated and closed in the manner described hereinabove have been found to be superior to food casings pleated and closed by present, commercially accepted methods and apparatus. Food casings produced in accordance with the present invention were first water soaked, stuffed with a food item, such as a raw meat emulsion, and were then processed in cooking and curing apparatus following conventional, commercially accepted procedures. The food casings were about 4 feet in length and about 5 inches in diameter and were suspended from conventional smoke sticks during cooking and curing by the coaction of the beaded ends of the hanger loop forming an anchoring means with the wire clip section. No manual preparation of the hanger loops was required or necessary before they were placed on the smoke sticks. During cooking and curing, the casing and the encased meat emulsion shrank. No problems of slippage or release of the encased product from the hanger loop were encountered due to the firm coaction of the beaded ends of the hanger loop with the wire clip section thereby providing the anchoring means which retained the encased product securely suspended. The thusly cooked and cured encased meat emulsion products were removed from their hanger loops by gripping the casings and applying a sharp, downward force snapping them so as to force the beaded ends of the hanger loop upwardly against the mated ends of the wire clip section forcing the wire clip section open at this point thereby freeing the encased meat products from their hanger loops.

Raw meat emulsions, such as bologna meat emulsion, encased in food casings closed by conventional means, such as with twine or string were found, in some instances, to release and fall from their suspension means during cooking and curing. Prior to suspending these encased meat emulsions, the loops of string or twine comprising the hanger loops had to be manually untangled since they became knotted and tangled during the water soaking step. The high degree of shrinkage of the encased meat emulsions during cooking and curing, the weight and size of the encased meat emulsions and the type of suspension means employed are all factors which are believed to have contributed to the premature release of the encased meat emulsions from their conventional suspension means during processing. Those encased meat emulsions which were suspended by conventional means during cooking and curing were also difficult to remove from the smoke sticks since they had to be lifted in order to free them from their suspension means. When the encased meat emulsions were attempted to be removed from their suspension means by snapping them free, the entire casing end was removed leaving the casing end ragged and unsightly.

While the present invention has been described in some detail and set forth with particularity, it should be understood that the same is susceptible of various modifications, changes and alterations, in addition to those described and set forth hereinabove, without departing from the scope and spirit of the invention.

I claim:

1. A food casing having at one end thereof a hanger loop and an end closure comprising a resilient wire clip, said end of said casing having a plurality of pleats and said hanger loop having free ends positioned adjacent to said pleats by said wire clip, the free ends of said hanger loop having beads thereon, said clip having openable mating ends positioned adjacent the free ends of said loop, said beads and clip cooperating to maintain said loop in position at said end of said casing, said clip being momentarily openable by said beads upon the exertion of a snapping force to said loop to permit removal of said loop from said casing without opening said casing or removing said clip.

2. A food casing as defined by claim 1 in which both free ends of said loop are positioned on the same side of said casing.